United States Patent
Li et al.

(10) Patent No.: US 9,958,595 B2
(45) Date of Patent: May 1, 2018

(54) LIGHT GUIDE PLATE ASSEMBLY, SIDE-TYPE BACKLIGHT SOURCE MODULE AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Heng Li, Beijing (CN); Zhiyu Qian, Beijing (CN); Zhengyuan Zhang, Beijing (CN); Lin Lin, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 26 days.

(21) Appl. No.: 15/140,854

(22) Filed: Apr. 28, 2016

(65) Prior Publication Data
US 2016/0349430 A1    Dec. 1, 2016

(30) Foreign Application Priority Data
May 29, 2015 (CN) .......................... 2015 1 0294057

(51) Int. Cl.
*F21V 7/00* (2006.01)
*F21V 8/00* (2006.01)
(Continued)

(52) U.S. Cl.
CPC .......... *G02B 6/005* (2013.01); *G02B 6/0083* (2013.01); *G02F 1/1336* (2013.01); *G02F 1/167* (2013.01);
(Continued)

(58) Field of Classification Search
CPC ..... G02B 6/005; G02B 6/0083; G02F 1/1336; G02F 1/167; G02F 1/133615; G02F 2001/133601
(Continued)

(56) References Cited

U.S. PATENT DOCUMENTS 8,917,438 B2 * 12/2014 Gerardus van Lieshout ............... G02B 5/201
359/295
2004/0252360 A1  12/2004 Webber et al.
(Continued)

FOREIGN PATENT DOCUMENTS

CN     1678954 A     10/2005
CN     101382719 B   4/2012
(Continued)

OTHER PUBLICATIONS

May 4, 2017—(CN) First Office Action Appn 201510294057.1 with English Tran.
(Continued)

*Primary Examiner* — Karl D Frech
(74) *Attorney, Agent, or Firm* — Banner & Witcoff, Ltd.

(57) ABSTRACT

A light guide plate assembly comprising: a first substrate which is transparent and positioned on a light-emitting side of the light guide plate assembly; a second substrate which is disposed opposite to the first substrate; and a plurality of light modulation units which are disposed between the first substrate and the second substrate, wherein each of the light modulation units comprises: a first electrode which is disposed adjacent to the first substrate; a second electrode which is disposed adjacent to the second substrate, wherein the first electrode and the second electrode are configured to generate an electric field therebetween; and an electrophoretic capsule layer which is positioned between the first electrode and the second electrode and comprises an elec- (Continued)

trophoretic capsule containing white electrophoretic particles and black electrophoretic particles which are dispersed in transparent dispersing medium and are oppositely charged.

20 Claims, 5 Drawing Sheets

(51) Int. Cl.
    *G02F 1/167*    (2006.01)
    *G02F 1/1335*   (2006.01)

(52) U.S. Cl.
    CPC .............. *G02F 1/133615* (2013.01); *G02F 2001/133601* (2013.01)

(58) Field of Classification Search
    USPC ........................................................ 362/606
    See application file for complete search history.

(56) References Cited

U.S. PATENT DOCUMENTS

2010/0265566 A1   10/2010  Han et al.
2016/0062206 A1*   3/2016  Paolini, Jr. ................ G02F 1/01
                                                      156/247

FOREIGN PATENT DOCUMENTS

CN         104321682 A     1/2015
KR     20140002252 A     1/2014

OTHER PUBLICATIONS

Sep. 22, 2017—(CN) Second Office Action Appn 201510294057.1 with English Tran.

* cited by examiner

LIGHT GUIDE PLATE ASSEMBLY, SIDE-TYPE BACKLIGHT SOURCE MODULE AND DISPLAY DEVICE

This application claims priority to and the benefit of Chinese Patent Application No. 201510294057.1 filed on May 29, 2015, which application is incorporated herein in its entirety.

TECHNICAL FIELD

Embodiments of the present disclosure relate to a light guide plate assembly, a side-type backlight source module and a display device.

BACKGROUND

Figure 1:
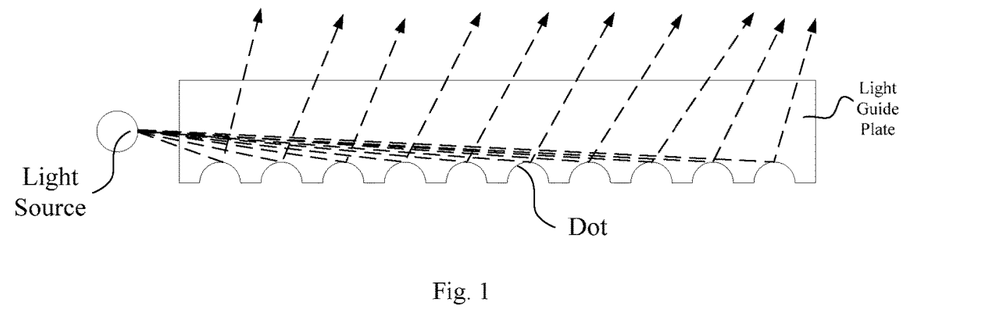
FIG. 1 is an illustrative schematic diagram of light guiding principle of a conventional light guide plate.

A backlight source module is an indispensable component in Liquid Crystal Display (LCD). The light guide plate is one of its key structures. As illustrated in FIG. 1, light (as indicated by the dashed arrow in the figure) emitted from a point light source or a linear light source positioned at a side of the light guide plate is irradiated onto scattering dots disposed on the bottom surface of the light guide plate after being incident into the light guide plate and then is scattered, and thus the point light source or the linear light source is transformed into a surface light source which emits light upwards, thereby providing a uniform backlight for the LCD.

In the conventional technologies, the dots on the bottom surface of the light guide plate is usually formed by dotting on a main structure made of acrylic material (i.e., organic glass) with a laser beam and the above scattering effect is achieved by the principle of stereo diffuse reflection at embosses.

However, because the dots distributed on the bottom surface of the light guide plate is regular, partial adjustment of the light is not allowed and it is difficult to effectively increase the contrast of a displayed image.

SUMMARY

Embodiments of the present invention provide a light guide plate assembly, a side-type backlight source module and a display device. By means of the light guide plate assembly, partial dynamic light modulation in various regions of the backlight source can be achieved and the contrast of the displayed image can be improved.

A light guide plate assembly comprises a first substrate which is transparent and positioned on a light-emitting side of the light guide plate assembly; a second substrate which is disposed opposite to the first substrate; and a plurality of light modulation units which are disposed between the first substrate and the second substrate, wherein each of the light modulation units comprises: a first electrode which is transparent and is disposed adjacent to the first substrate; a second electrode which is disposed adjacent to the second substrate, wherein the first electrode and the second electrode are configured to form an electric field therebetween; and an electrophoretic capsule layer which is positioned between the first electrode and the second electrode and comprises an electrophoretic capsule containing white electrophoretic particles and black electrophoretic particles which are dispersed in transparent dispersing medium and are oppositely charged.

At least one embodiment of the present disclosure provides a side-type backlight source module comprising a light source and a light guide plate assembly as described above, wherein the light source is positioned at one side or two opposite sides of the light guide plate.

At least one embodiment of the present disclosure further provides a display device comprising the side-type backlight source module as described above.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

FIG. 5a is a partial structural top view corresponding to the section structure as illustrated in FIG. 2a;

REFERENCE NUMERALS

01—light guide plate assembly; 10—first substrate; 11—first electrode; 12—first driving signal wire; 13—first transparent insulation layer; 20—second substrate; 21—second electrode; 22—second driving signal wire; 23—second transparent insulation layer; 30—light modulation unit; 31—electrophoretic capsule layer; 310—electrophoretic capsule; 310a—transparent dispersing medium; 310w— white electrophoretic particle; 310*b*—black electrophoretic particle; 02—light source; 03—optical film.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

It is to be noted that an orientation or positional relationship indicated by terms of "upper", "lower", "row direction" and "column direction" and etc. used in the description and the claims of the present disclosure is an orientation or positional relationship presented on the basis of the drawings. It is only intended to describe the embodiments of the present disclosure and simplify the description, rather than indicate or suggest that the interested device or element must have the particular orientation, or be configured and operated in the particular orientation. Thus, it cannot be construed as a restriction to the present disclosure.

For example, in some cases, an embodiment involving "row direction" can be implemented in occasion of "column direction" and vice versa. A solution obtained by having the configuration described by the present disclosure rotated by 90 degree or mirroring the configuration described by the present disclosure is within the scope of the present disclosure.

Figure 2A:
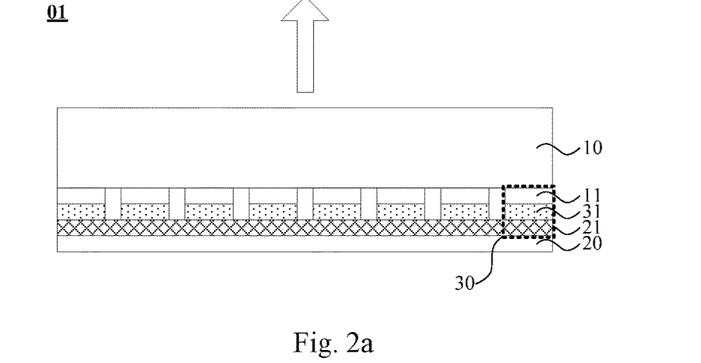
FIG. 2a is a first illustrative structural view of a section of the light guide plate assembly according to one embodiment of the present disclosure in a direction perpendicular to the plate surface.
Figure 2B:
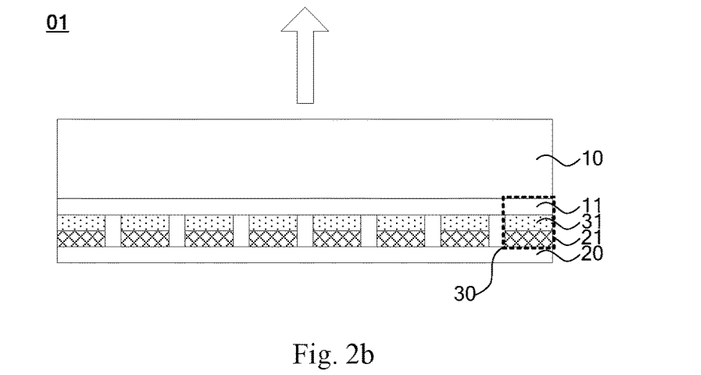
FIG. 2b is a second illustrative structural view of a section of the light guide plate assembly according to one embodiment of the present disclosure in a direction perpendicular to the plate surface.
Figure 2C:
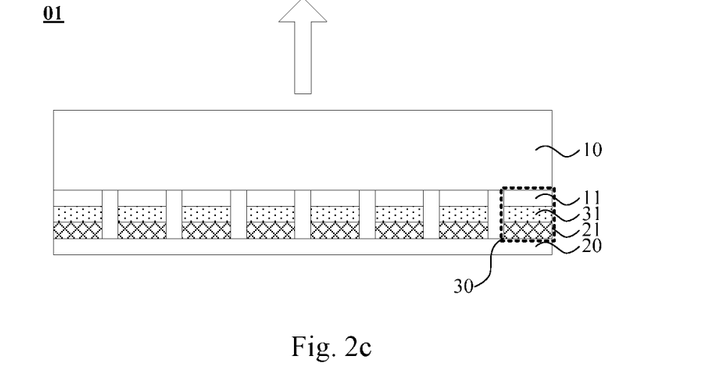
FIG. 2c is a third structural view of a section of the light guide plate assembly according to one embodiment of the present disclosure in a direction perpendicular to the plate surface.
Figure 3:
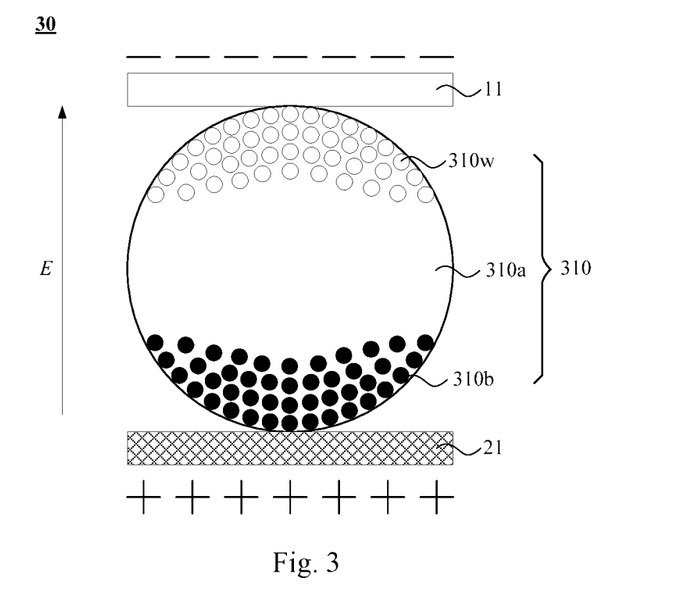
FIG. 3 is an enlarged illustrative structural diagram of the light modulation unit as illustrated in FIG. 2a to FIG. 2c.

One embodiment of the present disclosure provides a light guide plate assembly 01. As illustrated in FIG. 2*a* to FIG. 2*c*, the light guide plate assembly 01 comprises a first substrate 10 which is transparent and disposed on the light-emitting side and a second substrate 20 disposed opposite to the first substrate 10, as well as a plurality of light modulation units 30 disposed between the first substrate 10 and the second substrate 20. The light modulation unit 30 comprises a first electrode 11 being transparent and disposed adjacent to the first substrate 10 and a second electrode 21 disposed adjacent to the second substrate 20, the first electrode 11 and the second electrode 21 configured to generate an electric field therebetween. The light modulation unit 30 further comprises an electrophoretic capsule layer 31 disposed between the first electrode 11 and the second electrode 21. As illustrated in FIG. 3, the electrophoretic capsule layer comprises an electrophoretic capsule 310 containing white electrophoretic particles 310*w* and black electrophoretic particles 310*b* which are dispersed in transparent dispersing medium 310*a* and are oppositely charged.

To facilitate understanding of the present invention, the concept of "electrophoretic capsule" involved in the embodiments of the present disclosure is explained below.

With reference to FIG. 3, the electrophoretic capsule 310 comprises a transparent sealing cavity typically having a sphere shape with a diameter usually in "micron" order of magnitude. The electrophoretic capsule 310 is filled with transparent dispersing medium 310*a* in which the oppositely charged white electrophoretic particles 310*w* and black electrophoretic particles 310*b* are dispersed.

A circumstance in which the white electrophoretic particles 310*w* are positively charged and the black electrophoretic particles 310*b* are negatively charged is taken as an example. When the electrophoretic capsule 310 is positioned between the electrodes, the upper first electrode 11 is applied with a negative voltage and the lower second electrode 21 is applied with a positive voltage. Under effect of the electric field force, the positively charged white electrophoretic particles 310*w* will move towards the electrode having an opposite electrical polarity (i.e., the first electrode 11) and the negatively charged black electrophoretic particles 310*b* will move towards the electrode having an opposite electrical polarity (i.e., the second electrode 21). Such phenomenon is called as "electrophoresis (abbreviated as EP)". Technology for separation by means of charged particles having different moving directions in the electric field is called as electrophoresis technology.

Here, the oppositely charged white electrophoretic particles 310*w* and black electrophoretic particles 310*b* can be made of materials in the conventional art, for example, materials in Electronic Paper (abbreviated as E-Paper) technology. The embodiments of the present disclosure are not limited to this.

By way of example, the white electrophoretic particles 310*w* can be inorganic nano particles, such as $TiO_2$, $SiO_2$, $Al_2O_3$, Ag, Pt, Cd, Se. Of course, the white electrophoretic particles can also be white organic particles such as white polymer electrophoretic particles prepared by dispersion polymerization of styrene and divinylbenzene as main monomers. The black electrophoretic particles 310*b* can be carbon particles. Of course, they can also be black organic particles such as black polymer electrophoretic particles prepared by suspension polymerization of carbon particles and oligoester monomers.

With reference to FIG. 3, the electric field generated between the first electrode 11 and the second electrode 21 causes the oppositely charged white electrophoretic particles 310*w* and black electrophoretic particles 310*b* to move by the electric field force.

For any one of the light modulation units 30, in case that there is an electric field generated between the first electrode 11 and the second electrode 21, under effect of the electric field force (indicated by "E" in the figure), the positively charged electrophoretic particles are accumulated on a side of the electrophoretic capsule 310 adjacent to the electrode having a lower electrical potential, and the negatively charged electrophoretic particles are accumulated on a side of the electrophoretic capsule 310 adjacent to the electrode having a higher electrical potential.

Here, when the upper first electrode 11 is applied with a negative voltage and the lower second electrode 21 is applied with a positive voltage, the electric field force E has a direction which is directed from the second electrode 21 to the first electrode 11, positively charged electrophoretic particles (for example, the white electrophoretic particles 310*w*) are accumulated on a side of the electrophoretic capsule layer 31 adjacent to the electrode having a lower electrical potential (i.e., the first electrode 11) and negatively charged electrophoretic particles (for example, the black electrophoretic particles 310*b*) are accumulated on a side of the electrophoretic capsule layer 31 adjacent to the electrode having a higher electrical potential (i.e., the second electrode 21). Alternatively, when the upper first electrode 11 is applied with a positive voltage and the lower second electrode 21 is applied with a negative voltage, the electric field force E has a direction which is directed from the first electrode 11 to the second electrode 21, positively charged electrophoretic particles (for example, the white electrophoretic particles 310*w*) are accumulated on a side of the electrophoretic capsule layer 31 adjacent to the electrode having a lower electrical potential (i.e., the second electrode 21) and negatively charged electrophoretic particles (for example, the black electrophoretic particles 310b) are accumulated on a side of the electrophoretic capsule layer 31 adjacent to the electrode having a higher electrical potential (i.e., the first electrode 11).

Since any one of the light modulation units 30 can form an electric field therein to separate the oppositely charged white electrophoretic particles 310w and black electrophoretic particles 310b, the relative structures of the first electrode 11 and the second electrode 21 can be any one of the following three options, but is not limited thereto.

Option One:

With reference to FIG. 2a, the second electrodes 21 in all the light modulation units 30 are of a plate-like integral structure. That is to say, they are connected with each other. On the contrary, the first electrodes 11 in all the light modulation units 30 are of an independent structure. Therefore, a relatively independent electric field can be generated in each light modulation unit 30.

Option Two:

With reference to FIG. 2b, the first electrodes 11 in all the light modulation units 30 are of a plate-like integral structure. That is to say, they are connected with each other. Accordingly, the second electrodes 21 in all the light modulation units 30 are of an independent structure. Therefore, a relatively independent electric field can be generated in each light modulation unit 30.

Option Three:

With reference to FIG. 2c, the first electrodes 11 and the second electrodes 21 in all the light modulation units 30 are of an independent structure. Therefore, a relatively independent electric field can be generated in each light modulation unit 30.

It can be appreciated from the above description that any one of the light modulation units 30 can generate an electric field therein to separate the oppositely charged white electrophoretic particles 310w and black electrophoretic particles 310b. Therefore, the electrophoretic capsule layers 31 in each light modulation unit 30 can be of structures, as illustrated in FIG. 2a to FIG. 2c, which are independent from each other and are not in contact with each other.

In consideration of the accuracy of partial light modulation, in one embodiment according to the present disclosure, the electrophoretic capsule layers 31 in each light modulation unit 30 are of structures which are independent from each other and are not in contact with each other as illustrated in FIG. 2a to FIG. 2c, thereby preventing the electrophoretic capsule layers 31 in adjacent light modulation units 30 from being affected by an adjacent electric field which otherwise would lead to a deviation in partial light modulation.

In the above-described light guide plate assembly 01, since the first substrate 10 is positioned on the light-emitting side of the light guide plate assembly 01, the first substrate 10 is transparent so that the light guiding function of the light guide plate assembly 01 will not be affected. The light-emitting direction of the light guide plate assembly 01 is indicated by the arrow direction in the figure, if it is taken as an example that the first substrate 10 is placed above the second substrate 20.

The above transparent first substrate 10 can be made of any transparent material commonly used in the art, such as PMMA (Polymethyl Methacrylate), PC (Polycarbonate), PI (Polyimide), PES (Polyethersulfone resin) and PET (Polyethylene terephthalate), but is not limited thereto.

Moreover, to make the light from the point light source or the surface light source disposed on a side(s) of the above light guide plate assembly 01 (which can be one side of the light guide plate assembly 01 or two opposite sides of the light guide plate assembly 01) be sufficiently incident into the light guide plate assembly 01, the first substrate 10 can have a thickness much greater than the thickness of the second substrate 20. For example, the thickness of the first substrate 10 can be five to ten times greater than the thickness of the second substrate 20.

Similarly, since the first electrode 11 is disposed adjacent to the first substrate 10 on the light-emitting side, the first electrode 11 is transparent so that the transmittance of the backlight exiting from the first substrate 10 will not be affected.

Here, the above transparent first electrode 11 can be made of transparent conductive materials, such as any one of ITO (Indium Tin Oxide), IZO (Indium Zinc Oxide) and FTO (Fluorine-Doped Tin Oxide), but is not limited thereto.

In the above light guide plate assembly 01 according to the embodiments of the present disclosure, the light modulation unit 30 positioned between the first substrate 10 and the second substrate 20 which are oppositely arranged is equivalent to the dots disposed on the bottom of the light guide plate of the conventional art. For any one of the light modulation units 30, since in case that there is an electric field generated between the first electrode 11 and the second electrode 21, along the direction of the electric field force E, the positively charged electrophoretic particles (for example, the white electrophoretic particles 310w) are accumulated on a side of the electrophoretic capsule layer 31 adjacent to the electrode having a lower electrical potential, and the negatively charged electrophoretic particles (for example, the black electrophoretic particles 310b) are accumulated on a side of the electrophoretic capsule layer 31 adjacent to the electrode having a higher electrical potential. The white electrophoretic particles 310w have a strong scattering effect on the light incident into the light guide plate assembly 01, while the black electrophoretic particles 310b have a weak scattering effect on the light incident into the light guide plate assembly 01. Therefore, as illustrated in FIG. 4, by use of the oppositely charged electrophoretic particles in the electrophoretic capsule 310 having various arrangements under effect of an external electric field, the proportion of scattered light in various regions can be flexibly adjusted by adjusting directions of the electric field forces E in various light modulation units 30, so that the light intensity in partial regions of the light guide plate assembly 01 can be controlled thereby achieving an effect of partial dynamic light modulation.

When the light guide plate assembly 01 is applied to a liquid crystal display panel to provide the display panel with a backlight source, the contrast in various regions of the liquid crystal display panel can be increased by the partial dynamic light modulation and thus the display effect is improved. For example, parameters such as gray scale of the image displayed in various regions of the liquid crystal display panel can be monitored by corresponding electrical circuits, and directions of the electrical field forces in the light modulation units 30 can be adjusted on the basis of the various gray scales in these regions so as to adjust the contrast in various regions of the liquid crystal display panel by way of partial dynamic light modulation.

Figure 4:
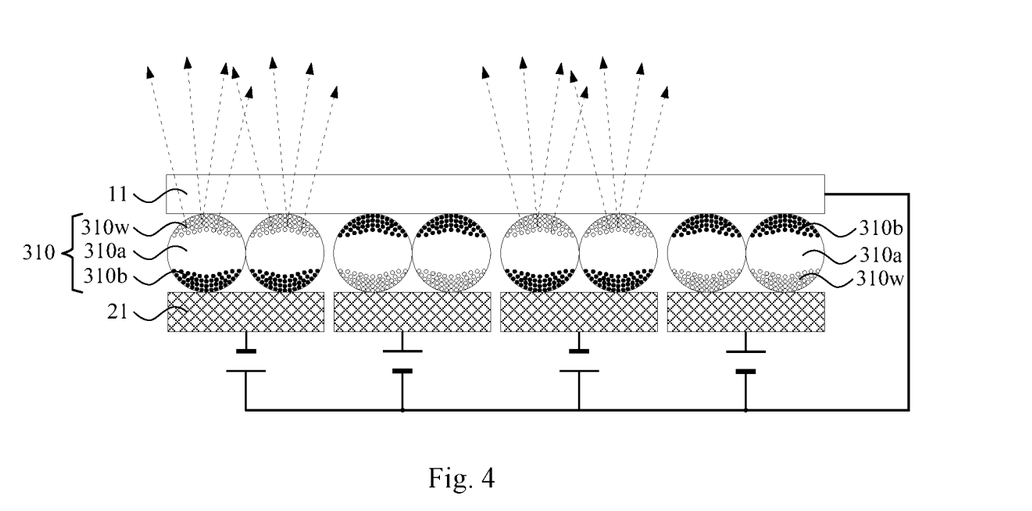
FIG. 4 is a schematic diagram illustrating the partial dynamic light modulation effect which can be obtained by the light guide plate assembly according to one embodiment of the present disclosure.

Here, an explanation is made by taking a case, as illustrated in FIG. 4, in which the first electrodes 11 are of a plate-like integral structure and the second electrodes 21 are of an independent structure as an example. The number of electrophoretic capsules 310 in the electrophoretic capsule layer 31 of each light modulation unit 30 is not restricted, but can be modified according to the size of the light modulation unit 30 and the particle diameter of the electrophoretic capsule 310. The explanation is made by merely exemplifying that one second electrode 21 is corresponding to two electrophoretic capsules 310 as illustrated in the figure.

In one embodiment of the present disclosure, the above light modulation units 30 are arranged in an array. That is to say, in a plate surface direction of the above-described light guide plate assembly 01, the above-described light modulation units 30 are disposed along both row direction and column direction. Therefore, partial light modulation can be achieved for any arbitrary region.

Figure 5A:
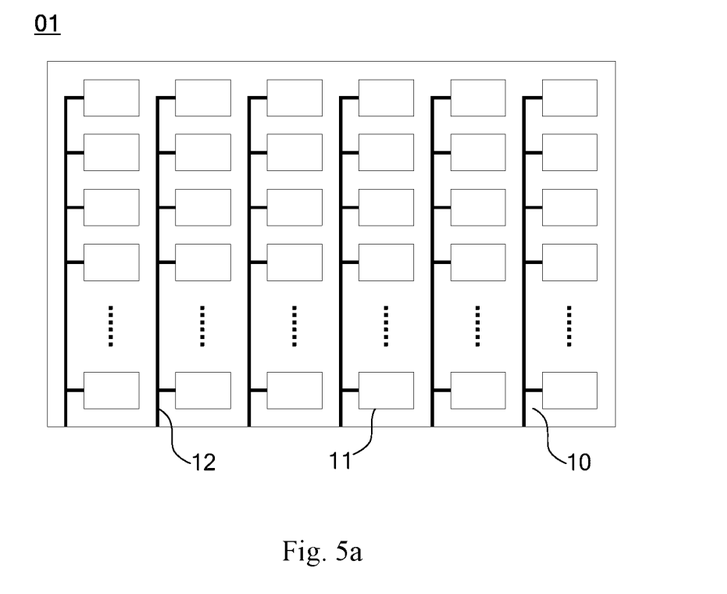

With respect to a case in which the first electrodes 11 and the second electrodes 21 have structures in accordance with the above-described Option One, that is to say, the second electrodes 21 in a plurality of light modulation units 30 are of a plate-like integral structure, as illustrated in FIG. 5a, the above light guide plate assembly 01 further comprises a plurality of first driving signal wires 12 disposed on the first substrate 10. The first driving signal wires 12 are connected with the first electrodes 11 on each column or each row respectively, although it is to be noted that the first driving signal wires 12 are respectively connected with the first electrodes 11 on each column in FIG. 5a which is merely an example to make the explanation.

Here, since the second electrodes 21 are of a plate-like integral structure, an identical voltage is applied to the second electrode 21 within each light modulation unit 30. The first electrodes 11 of each column or each row are connected with the first driving signal wire 12, so that directions of the electric fields in various light modulation units 30 are controlled by inputting corresponding driving signals to the first driving signal wires 12.

Figure 6A:
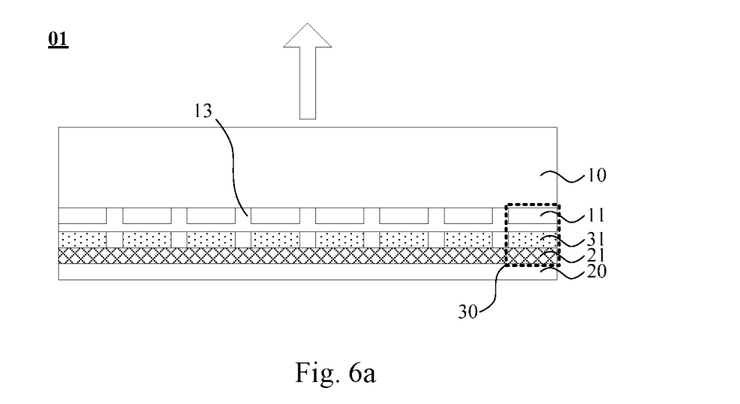
FIG. 6a is a fourth illustrative structural view of a section of the light guide plate assembly according to one embodiment of the present disclosure in a direction perpendicular to the plate surface.

In one embodiment of the present disclosure, as illustrated in FIG. 6a, the above light guide plate assembly 01 further comprises a first transparent insulation layer 13 arranged between the first electrodes 11 and the electrophoretic capsule layer 31. The electrophoretic capsule layer 31 is disposed on the surface of the first transparent insulation layer 13.

The first transparent insulation layer 13 can be made of transparent insulating materials, such as any one of PMMA, PC, PI, PES and PET. The present disclosure is not limited thereto.

Here, arranging the first transparent insulation layer 13 between the first electrodes 11 and the electrophoretic capsule layer 31 has the following two effects.

In one aspect, since the first transparent insulation layer 13 covers the surfaces of the plurality of first electrodes 11 independent from each other, it can provide a flat surface to form the electrophoretic capsule layer 31, which facilitates forming the electrophoretic capsule layer 31 by spraying and the like. Moreover, the first transparent insulation layer 13 is usually made of organic materials and thus has a stronger adherence to the electrophoretic capsules 310 in the electrophoretic capsule layer 31 than the first electrodes 11. Therefore, positional deviation of the electrophoretic capsules 310 can be avoided which would otherwise affect the effect of partial light modulation.

In the other aspect, since the electrophoretic capsule layer 31 has a very small thickness, after the first transparent insulation layer 13 is additionally provided between the first electrodes 11 and the second electrodes 21, the intensity of the electric field generated between the first electrodes 11 and the second electrodes 21 can be adjusted by setting the thickness of the first transparent insulation layer 13, and thus the moving speed of charged particles in the electric field can be flexibly adjusted, thereby flexibly adjusting the response time of the partial light modulation.

Figure 5B:
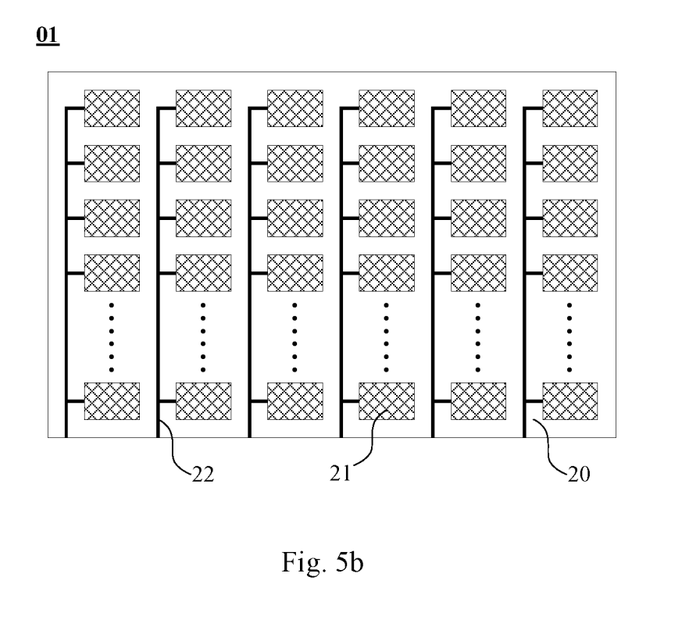
FIG. 5b is a partial structural top view corresponding to the section structure as illustrated in FIG. 2b.

With respect to a case in which the first electrodes 11 and the second electrodes 21 have structures in accordance with the above-described Option Two, that is to say, the first electrodes 11 in a plurality of light modulation units 30 are of a plate-like integral structure, as illustrated in FIG. 5b, the above light guide plate assembly 01 further comprises a plurality of second driving signal wires 22 disposed on the second substrate 20. The second driving signal wires 22 are connected with the second electrodes 21 on each column or each row respectively, although it is to be noted that the second driving signal wires 22 are respectively connected with the second electrodes 21 on each column in FIG. 5b which is merely an example to make the explanation.

Since the first electrodes 11 are of a plate-like integral structure, an identical voltage is applied to the first electrodes 11 within each light modulation unit 30. The second electrodes 21 of each column or each row are connected with the second driving signal wires 22, so that directions of the electric fields in various light modulation units 30 are controlled by inputting corresponding driving signals to the second driving signal wires 22.

Figure 6B:
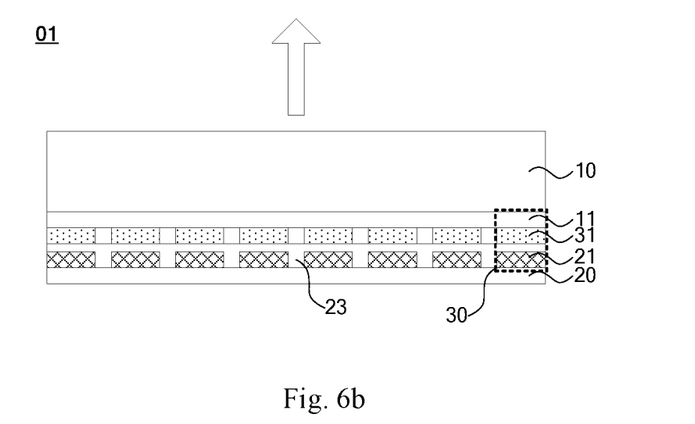
FIG. 6b is a fifth illustrative structural view of a section of the light guide plate assembly according to one embodiment of the present disclosure in a direction perpendicular to the plate surface.

In one embodiment of the present disclosure, as illustrated in FIG. 6b, the above light guide plate assembly 01 further comprises a second transparent insulation layer 23 arranged between the second electrodes 21 and the electrophoretic capsule layer 31. The electrophoretic capsule layer 31 is disposed on the surface of the second transparent insulation layer 23.

The second transparent insulation layer 23 can be made of transparent insulating materials, such as any one of PMMA, PC, PI, PES and PET. The present disclosure is not limited thereto.

Here, arranging the second transparent insulation layer 23 between the second electrodes 21 and the electrophoretic capsule layer 31 has following two effects.

In one aspect, since the second transparent insulation layer 23 covers the surfaces of the plurality of second electrodes 21 independent from each other, it can provide a flat surface, which facilitates forming the electrophoretic capsule layer 31 by spraying and the like. Moreover, since the second transparent insulation layer 23 is usually made of organic materials, it has a stronger adherence to the electrophoretic capsules 310 in the electrophoretic capsule layer 31 than the second electrodes. Therefore, positional deviation of the electrophoretic capsules 310 can be avoided which would otherwise affect the effect of partial light modulation.

In the other aspect, since the electrophoretic capsule layer 31 has a very small thickness, after the second transparent insulation layer 23 is additionally provided between the first electrodes 11 and the second electrodes 21, the intensity of the electric field generated between the first electrodes 11 and the second electrodes 21 can be adjusted by setting the thickness of the second transparent insulation layer 23, and thus the moving speed of charged particles in the electric field can be flexibly adjusted, thereby flexibly adjusting the response time of the partial light modulation.

In one embodiment of the present disclosure, the second electrode 21 is made of reflective metallic material. The reflective metallic material comprises one of Al, Cu, Mg, Ag, Li and K or an alloy thereof.

When the second electrode 21 is made of reflective metallic material, since the second electrode 21 is disposed below the first substrate 10 at the light-emitting side, it can have a function of the reflector located below the light guide plate in the conventional backlight module and thus reflects the light incident on the second electrodes 21 further upwards, thereby improving the integrated level of the light guide plate assembly 01 and reducing the thickness of the backlight module.

To further increase the reflection area of the second electrodes 21, in one embodiment of the present disclosure, the second electrodes 21 are shaped to have a plate-like integral structure as illustrated in FIG. 6a.

Further, since the first driving signal wires 12 or the second driving signal wires 22 are configured to transmit corresponding driving signals to the first electrodes 11 or the second electrodes 21, to reduce the resistance of the signal wires, the first driving signal wires 12 or the second driving signal wires 22 are made of the same material as the second electrodes 21, i.e., are made of a material selected from Al, Cu, Mg, Ag, Li and K or an alloy thereof, as described above.

Since the light guide plate assembly 01 is configured to provide a backlight for the liquid crystal display panel, to further improve the effect of partial dynamic light modulation, in one embodiment of the present disclosure, each light modulation unit 30 corresponds with pixels or sub-pixels in the liquid crystal display panel one by one.

Therefore, each pixel or sub-pixel in the liquid crystal display panel has a corresponding light modulation unit 30 so that partial dynamic light modulation for each pixel or sub-pixel can be achieved.

In one embodiment of the present disclosure, the light guide plate assembly 01 further comprises a plurality of light modulation unit groups. Each light modulation unit group comprises four, or six, or nine light modulation units 30 arranged in a matrix.

Herein, an explanation is made by an example in which each light modulation unit group comprises four light modulation units 30 arranged in a matrix. Since each light modulation unit group comprises four light modulation units 30 arranged in a matrix, any one of the light modulation unit groups can achieve five different levels of light modulation in which the scattering level is successively decreased as indicated by the arrow in FIG. 7.

Figure 7:
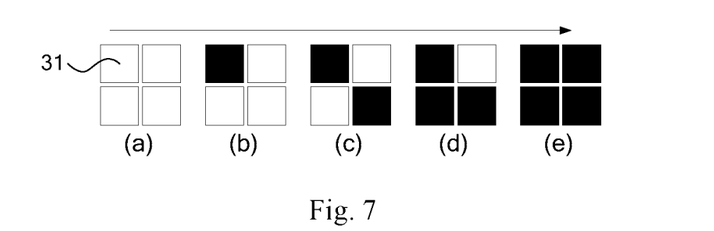
FIG. 7 is a second schematic diagram illustrating the partial dynamic light modulation effect which can be obtained by the above-described light guide plate assembly according to one embodiment of the present disclosure.

Part (a) in FIG. 7 is taken as an example, when the scattering level is the maximum, the white electrophoretic particles 310w in the electrophoretic capsule layer 31 within the four light modulation units 30 of the light modulation unit group are all accumulated on the side of the first electrodes 11 in the upper portion, which is shown by four white sections in the figure. That is to say, when the white electrophoretic particles 310w are positively charged, the first electrodes 11 have a relatively low electrical potential with respect to the second electrodes 21.

Part (e) in FIG. 7 is taken as an example, when the scattering level is the minimum, the black electrophoretic particles 310b in the electrophoretic capsule layer 31 within the four light modulation units 30 of the light modulation unit group are all accumulated on the side of the first electrodes 11 in the upper portion, which is shown by four black sections in the figure. That is to say, when the black electrophoretic particles 310b are negatively charged, the first electrodes 11 have a relatively high electrical potential with respect to the second electrodes 21.

In Part (b) of FIG. 7 in which the scattering level is lower than that in the Part (a) of FIG. 7, the upper left black electrophoretic particles 310b in the electrophoretic capsule layer 31 within the four light modulation units 30 of the light modulation unit group are accumulated on the side of the first electrodes 11 in the upper portion, while the white electrophoretic particles 310w in the electrophoretic capsule layer 31 within the other three light modulation units 30 are accumulated on the side of the first electrodes 11 in the upper portion. At this time, it is required that the first electrodes 11 of the light modulation unit in the upper left within the light modulation unit group have a relatively high electrical potential with respect to the second electrodes 21 while the first electrodes 11 of the other three light modulation units have a relatively low electrical potential with respect to the second electrodes 21. Driving of the first electrodes and the second electrodes which corresponds to the scattering levels as shown in Part (c) and Part (d) of FIG. 7 can be understood from the driving described in connection with Part (a), Part (b) and Part (e) of FIG. 7, and its description is omitted here.

Further, when each light modulation unit group comprises six light modulation units 30 arranged in a matrix, seven different levels of light modulation can be obtained. When each light modulation unit group comprises nine light modulation units 30 arranged in a matrix, ten different levels of light modulation can be obtained. Details have been omitted here.

Here, the more the light modulation units 30 comprised by each light modulation unit group are, the more diverse the obtained changes in the level of the light modulation are. And accordingly, driving load of the light guide assembly is getting greater and preparation of the light guide assembly is getting more complicated as well. Therefore, in one embodiment of the present disclosure, each light modulation unit group comprises four light modulation units 30 arranged in a matrix and can obtain five different levels of light modulation which matches with gray scale change of most liquid crystal display panels in the conventional technology and which will not make the driven load of the light guide plate assembly 01 too great and the preparation too complicated.

In one embodiment of the present disclosure, since the above light guide plate assembly 01 provides a backlight for the liquid crystal display panel, to further improve the effect of partial dynamic light modulation, each light modulation unit group corresponds with a pixel or a sub-pixel in the liquid crystal display panel one for one. Various scattering levels of partial dynamic light modulation can be obtained by making each pixel or sub-pixel in the liquid crystal display panel correspond to one light modulation unit group.

At least one embodiment of the present disclosure further provides a preparation method of the light guide plate assembly 01, which comprises the following:

S01: forming a first part;
S02: forming a second part;
S03: cell-assembling the first part and the second part previously formed and forming the light guide plate assembly 01.

Here, referring to FIG. 6a, forming a first part comprise:

S11: providing a first substrate 10 made of transparent material;
S12: forming first electrodes 11 of a plate-like integral structure on the first substrate 10, the first electrodes 11 being made of transparent conductive material.

Referring to FIG. 6a, forming a second portion comprises:

S21: providing a second substrate 20;
S22: providing a plurality of second electrodes 21 arranged in a matrix on the second substrate 20;
S23: forming a second transparent insulation layer 23 which covers the second electrodes 21;
S24: forming an electrophoretic capsule layer 31 mainly comprised of electrophoretic capsules 310 on the region on the second transparent insulation layer 23 corresponding to each second electrode 21 through spraying process.

Of course, the electrophoretic capsule layer 31 can further comprise components such as adhesives for improving adherence of the electrophoretic capsules 310.

In one embodiment of the present disclosure, S03 comprises:
cell-assembling a side of the first substrate 10 on which the first electrodes 11 are formed and a side of the second substrate 20 on which the electrophoretic capsule layer 31 is formed and thus forming the light guide plate assembly 01.

Figure 8:
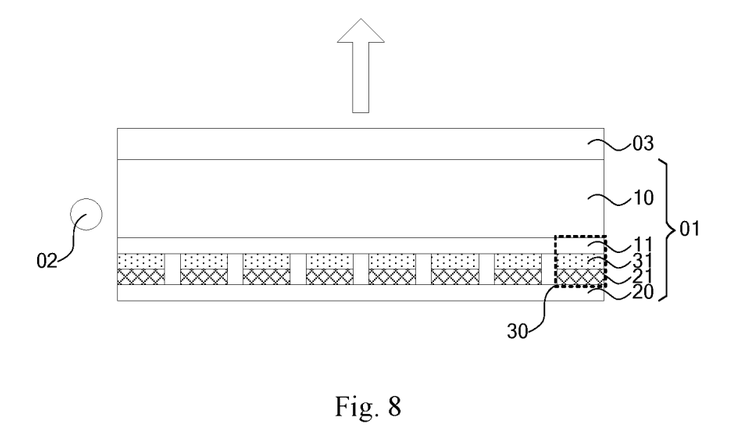
FIG. 8 is a illustrative structural view of a section of the side-type backlight source module according to one embodiment of the present disclosure in a direction perpendicular to the plate surface.

At least one embodiment of the present disclosure provides a side-type backlight source module. As illustrated in FIG. 8, the side-type backlight source module comprises a light source 02 and the light guide plate assembly 01 as described above. The light source 02 is positioned at one side or both of opposite sides of the light guide plate.

In one embodiment of the present disclosure, the light source 02 is an LED light bar having a structure in which a plurality of spaced-apart LED (Light Emitting Diode) chips are arranged in a circuit board and which has advantages such as slim profile and high light emitting efficiency. Of course, the light source 02 can also be a CCFL (Cold Cathode Fluorescent Lamp). The present disclosure is not limited thereto, as long as the light guide plate assembly 01 can be provided with a side-type backlight source.

In one embodiment of the present disclosure, as illustrated in FIG. 8, the side-type backlight source module further comprises an assembly such as an optical film 03 disposed on the light-emitting side of the light guide plate assembly 01. The side-type backlight source module can have a structure of conventional backlight source modules, the description of which is omitted here.

At least one embodiment of the present disclosure provides a display device comprising the side-type backlight source module as described above.

In the context, the display device can be any product or component having display function, such as a liquid crystal display, a liquid crystal television, a digital photo frame, a cell phone, a panel computer and etc.

It is to be noted that all the figures of the present disclosure are simply illustrative views of the light guide plate assembly and the side-type backlight source module comprising the light guide plate assembly and are only intended to describe the structures related to the inventive concept in the solution, while other structures or conventional structures irrelevant to the inventive concept are not embodied in the drawings or are only partially embodied in the drawings.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510294057.1 filed on May 29, 2015, the disclosure of which is hereby entirely incorporated by reference as a part of the present disclosure.

The invention claimed is:

1. A light guide plate assembly, comprising:
a first substrate which is transparent and positioned on a light-emitting side of the light guide plate assembly;
a second substrate which is disposed opposite to the first substrate; and
a plurality of light modulation units which are disposed between the first substrate and the second substrate, wherein each of the light modulation units comprises:
a first electrode which is transparent and is disposed adjacent to the first substrate;
a second electrode which is disposed adjacent to the second substrate, wherein the first electrode and the second electrode are configured to generate an electric field therebetween; and
an electrophoretic capsule layer which is disposed between the first electrode and the second electrode and comprises an electrophoretic capsule containing white electrophoretic particles and black electrophoretic particles which are dispersed in transparent dispersing medium and are oppositely charged.

2. The light guide plate assembly according to claim 1, wherein the light modulation units are arranged in an array.

3. The light guide plate assembly according to claim 1, further comprising:
a plurality of first driving signal wires on the first substrate, which are connected with the first electrodes on each column or each row respectively; and
a plurality of second driving signal wires on the second substrate, which are connected with the second electrodes on each column or each row respectively.

4. The light guide plate assembly according to claim 1, wherein
the second electrodes in the plurality of light modulation units are formed in a plate-like integral structure;
the light guide plate assembly further comprises a plurality of first driving signal wires on the first substrate, which are connected with the first electrodes on each column or each row respectively.

5. The light guide plate assembly according to claim 1, further comprising a first transparent insulation layer, wherein the first transparent insulation layer is arranged between the first electrodes and the electrophoretic capsule layer, and the electrophoretic capsule layer is disposed on a surface of the first transparent insulation layer.

6. The light guide plate assembly according to claim 5, wherein the first transparent insulation layer is made of any one of Polymethyl Methacrylate, Polycarbonate, Polyimide, Polyethersulfone resin and Polyethylene terephthalate.

7. The light guide plate assembly according to claim 1, wherein
the first electrodes in the plurality of light modulation units are formed in a plate-like integral structure;
the light guide plate assembly further comprises a plurality of second driving signal wires on the second substrate, which are connected with the second electrodes on each column or each row respectively.

8. The light guide plate assembly according to claim 1, further comprising a second transparent insulation layer, wherein the second transparent insulation layer is arranged between the second electrodes and the electrophoretic capsule layer, and the electrophoretic capsule layer is disposed on a surface of the second transparent insulation layer.

9. The light guide plate assembly according to claim 8, wherein the second transparent insulation layer is made of any one of Polymethyl Methacrylate, Polycarbonate, Polyimide, Polyethersulfone resin and Polyethylene terephthalate.

10. The light guide plate assembly according to claim 1, wherein the light guide plate assembly is adapted to provide a liquid crystal display panel with a backlight source, the light modulation units correspond with pixels or sub-pixels in the liquid crystal display panel one for one.

11. The light guide plate assembly according to claim 1, wherein the light guide plate assembly further comprises a plurality of light modulation unit groups, and each of the light modulation unit groups comprises four, or six or nine light modulation units arranged in a matrix.

12. The light guide plate assembly according to claim 11, wherein the light guide plate assembly is adapted to provide a liquid crystal display panel with a backlight source, the light modulation unit groups correspond with pixels or sub-pixels in the liquid crystal display panel one for one.

13. The light guide plate assembly according to claim 1, wherein the first electrode is made of transparent conductive material comprising any one of ITO, IZO and FTO.

14. The light guide plate assembly according to claim 1, wherein the second electrode is made of reflective metallic material.

15. The light guide plate assembly according to claim 14, wherein the reflective metallic material comprising one of Al, Cu, Mg, Ag, Li and K or an alloy thereof.

16. The light guide plate assembly according to claim 15, wherein the light guide plate assembly further comprises a first driving signal wire and/or a second driving signal wire, the first driving signal wire and/or the second driving signal wire is/are made of the same material as the second electrode.

17. The light guide plate assembly according to claim 1, wherein
at least one of the first substrate and the second substrate is made of any one of Polymethyl Methacrylate, Polycarbonate, Polyimide, Polyethersulfone resin and Polyethylene terephthalate.

18. The light guide plate assembly according to claim 1, wherein the white electrophoretic particles are made of inorganic nano particles or white organic particles, and the black electrophoretic particles are made of carbon black particles or black organic particles.

19. A side-type backlight source module, comprising a light source and a light guide plate assembly,
wherein the light source is positioned at one side or both of two opposite sides of the light guide plate;
the light guide plate assembly is the light guide plate assembly according to claim 1.

20. A display device comprising the side-type backlight source module according to claim 19.

* * * * *